United States Patent [19]

Winzer et al.

[11] 4,306,765

[45] Dec. 22, 1981

[54] BRANCH COMPONENT COMPRISING OPTICAL LIGHT WAVEGUIDES

[75] Inventors: Gerhard Winzer, Munich; Hans F. Mahlein; Achim Reichelt, both of Unterhaching, all of Fed. Rep. of Germany

[73] Assignee: Siemens Aktiengesellschaft, Berlin & Munich, Fed. Rep. of Germany

[21] Appl. No.: 126,220

[22] Filed: Mar. 3, 1980

[30] Foreign Application Priority Data

Mar. 15, 1979 [DE] Fed. Rep. of Germany ....... 2910291

[51] Int. Cl.³ .............................................. G02B 5/172
[52] U.S. Cl. ................................... 350/96.16; 350/320
[58] Field of Search ............... 350/96.15, 96.16, 96.20, 350/320; 156/158, 159; 370/1

[56] References Cited

U.S. PATENT DOCUMENTS 4,130,345 12/1978 Doellner ...................... 350/96.15 X
4,176,908 12/1979 Wagner ............................ 350/96.15

FOREIGN PATENT DOCUMENTS 52-64939 5/1977 Japan ................................ 350/96.15

OTHER PUBLICATIONS

Bloem et al, "Fiber-Optic Coupler," *IBM Tech. Discl. Bull.*, vol. 16, No. 1, Jun. 1973, pp. 146-147.
Kendall, "On Etching very Narrow Grooves in Silicon," *Appl. Phys. Lett.*, vol. 26, No. 4, Feb. 1975, pp. 195-198.

*Primary Examiner*—John D. Lee
*Attorney, Agent, or Firm*—Hill, Van Santen, Steadman, Chiara & Simpson

[57] ABSTRACT

A branch component and method of making the component which can be used either to distribute light from a single waveguide into four outgoing waveguides or to collect light from four incoming waveguides into a single outgoing waveguide. The component includes seven waveguides and at least three partially transmissive reflective layers disposed on the surface of a carrier with the first, second and third waveguides being arranged in a longitudinally extending first series, the fourth and fifth waveguides being arranged in a longitudinally extending second series extending perpendicular to the first series and a first reflective layer separating the first and fourth waveguides from the second waveguide, a second reflective layer separating the second and a sixth waveguide from a third waveguide and a third reflective layer separating the fourth and seventh waveguides from the fifth waveguide and the second and third reflective layer lying on a plane which extends perpendicular to a plane formed by the first reflective layer.

10 Claims, 2 Drawing Figures

BRANCH COMPONENT COMPRISING OPTICAL LIGHT WAVEGUIDES

BACKGROUND OF THE INVENTION

The present invention is directed to a branch component comprising light waveguides in particular for distributing light from an incoming light waveguide between outgoing light waveguides or for collecting light from a plurality of incoming light waveguides into a single outgoing waveguide.

A branch component of this type represents a fundamental requirement for an optical communication technology. For example, these branching components are required for wavelength multiplexers or demultiplexers. For this reason, a branch component should be produced as easily as possible and with a process which is largely standardizable with regard to the technology required.

SUMMARY OF THE INVENTION

The object of the present invention is to provide a branch component which can be produced particularly easily with available technology and which can be used as an optical collector, as a wavelength multiplexer, or as a demultiplexer, or which component can be used to construct these devices.

The object of the present invention is realized by a branch component comprising a carrier body having seven light waveguides and at least three partially transmissive reflective layers disposed thereon. The waveguides are arranged with the first, second and third waveguides being arranged in a longitudinally extending first series and a fourth and fifth waveguides being arranged in a longitudinally extending second series, each of the said adjacent waveguides in said series having a longitudinal axis being displaced less than a minimum displacement and inclined at less than a maximum permissable angle to insure light transfer therebetween. A first reflective layer is disposed between the first and second waveguides of the first series, a second reflective layer is disposed between the second and third waveguides, and a third reflective layer is disposed between the fourth and fifth waveguides of the second series with each of said second reflective layers being arranged to extend obliquely to the longitudinal axis of each of said waveguides. The second series of waveguides is arranged relative to the first series with the fourth waveguide engaging the first waveguide and being disposed on the same side of the first reflective layer. A sixth waveguide is arranged relative to the second waveguide to extend substantially parallel to the fourth waveguide and to be disposed on the same side as the second waveguide from the second reflective layer and a seventh waveguide extends substantially parallel to the first waveguide and is disposed relative to the fourth waveguide to be disposed on the same side as the third reflective layer. The oblique angles of each of the reflective layers are arranged so that the beam traveling in the first waveguide is partially reflected by the first layer into the fourth waveguide with the remaining portion passing into the second waveguide, the remaining portion in the second waveguide is partially reflected into the sixth waveguide by the second layer with the second layer passing a portion into the third waveguide and the portion reflected by the first layer into the fourth waveguide is partially reflected into the seventh waveguide by the third layer which will pass a portion into the fifth waveguide.

The term "maximum permissable displacement" signifies the amount of lateral displacement which is dependent upon the spacing between the two end surfaces of the waveguides that face each other and allow the transmission of the light between the two waveguides with the light intensity which is being transmitted between the two light waveguides being predetermined. The term "maximum permissable angle" is the maximum angle between the axes of the two waveguides, which angle still allows transmission of light therebetween. The acceptance angle of the light waveguides can be taken as a guide for the maximum permissable angle.

A particularly effective process for the production of the proposed component comprises providing a carrier body, forming a main groove in a flat surface of the carrier body, forming first and second branch grooves extending from opposite sides of the main groove at an angle thereto, forming a third branch groove from one of said first and second branch grooves at a distance from the main groove, placing a light waveguide in the main groove, placing light waveguides in the first and second groove abutting against the waveguide in the main groove and placing a waveguide in the third branch groove abutting the waveguide in the one groove which is intersected by the third branch, splitting the body into a plurality of parts by a plurality of cuts extending at a right angle to the flat surface of the body with a cut being positioned at each intersection of grooves and the cut forming an acute angle with the two grooves in such a manner that only one of the two light waveguides in the grooves is fully separated, polishing each of the cut surfaces to a desired finish to produce a pair of polished surfaces, applying a partially transmissive reflective layer to one of each pair of polished surfaces, said reflective layer covering a polished cut surface of one of the waveguides, and then reassembling and fixing the parts together so that each pair of polished surfaces lay opposite each other and are separated by the respective reflective layer.

While the above method will produce the device, it is preferred that it be further modified so that the first and second branch grooves extend parallel to one another with the spacing between their axes equal to the spacing between the main groove and the third branch groove which also extend parallel to each other. Said first and second branch grooves are at right angles to the main groove and each of the cuts is made at a 45° angle to each of the intersecting grooves. A branch component as proposed can be particularly advantageously used to construct wavelength multiplexer or demultiplexer systems which have a tree-like branching system.

DESCRIPTION OF THE PREFERRED EMBODIMENTS

Figure 1:
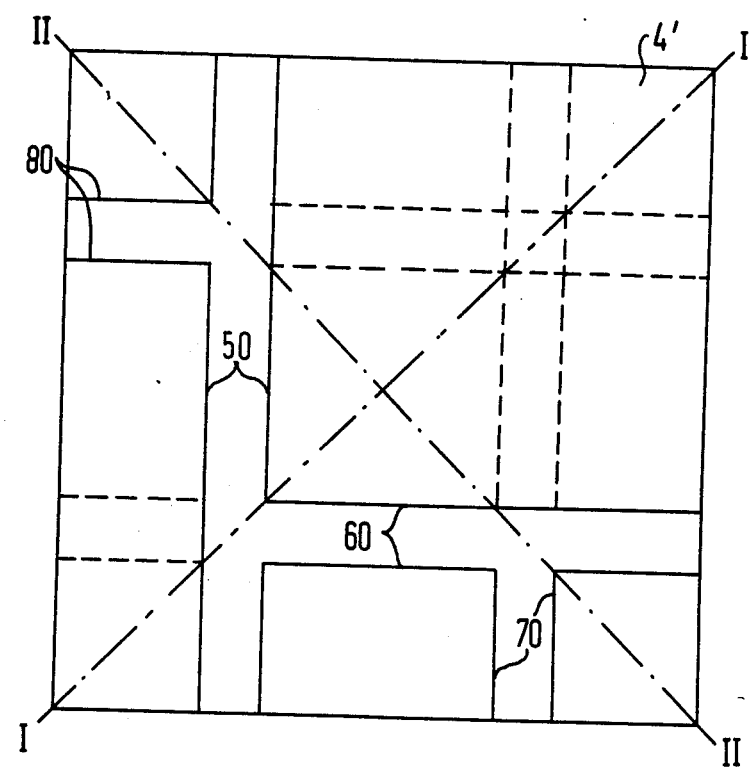
FIG. 1 is a plan view of a carrier body provided with grooves in accordance with the method of the present invention.
Figure 2:
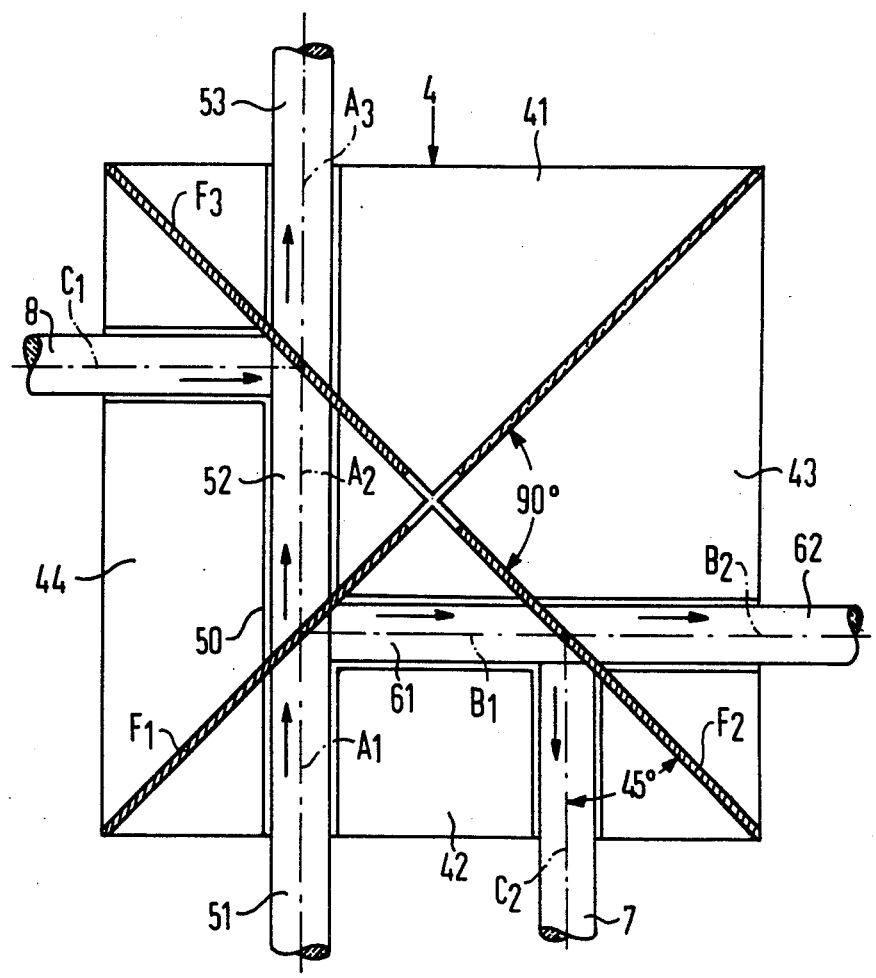
FIG. 2 is a plan view of a branch component of the present invention.

The principles of the present invention are particularly useful when incorporated into a branch component generally indicated at 4 in FIG. 2. To produce the component, the process provides a carrier body or substrate such as a silicon plate 4', which as illustrated has a squared configuration in FIG. 1.

A main groove 50 is formed into a flat surface of the carrier body 4' with first and second branch grooves 60 and 80 being formed to extend from opposite sides of the main groove 50. A third branch groove 70 is formed to extend from one of the branch grooves such as the branch groove 60. It is noted that the formation of each of the branch grooves 60, 70 and 80 as well as the main groove 50 can be accomplished by means of anisotropic etching. It is also possible to form the grooves by cutting or milling the grooves into the surface which will result in the branch grooves having the extended portions illustrated in dashed lines. The main groove and the groove 70 are parallel to each other and are also parallel to a pair of edges of the carrier plate or body 4'. As illustrated, the grooves 50 and 70 are spaced inward from each of the edges the same distance. The branch grooves 60 and 80 are also parallel to each other and extend perpendicular to the axis of the groove 50 and thus are parallel to the other pair of edges of the body 4'. The grooves 80 and 60 are also displaced inward from the parallel edges a distance equal to the distance of displacement for the grooves 50 and 70. Thus the grooves 50 and 70 are the same distance apart as the grooves 60 and 80 are apart.

After forming the groove, the next step includes assembling the light waveguides into the grooves and an example of a desired light waveguide is a multimode glass fiber having a core surrounded by a cladding layer. It is desirable that the light waveguide or fiber that is to be in the main groove 50 is first assembled in the main groove. The light waveguides such as the optical fibers for the first and second branch grooves 60 and 80 are then inserted with their ends abutting against the light waveguide in the main groove 50. Finally, the light waveguide for the groove 70 is inserted with its end abutting the waveguide in the groove 60.

After each of the light waveguides has been inserted, they may be secured in their respective grooves by using an appropriate adhesive such as an optical cement. It is also expedient to fix the light waveguides in the grooves by means of a covering plate consisting, for example, of glass which will serve to cover the light waveguides and which plate is firmly connected to the flat surface of the plate 4'.

After assembling and securing the waveguides in their respective grooves, the body formed in this manner is then split up into four parts by a cutting or dividing disc or the like. Since the distance between the grooves 70 and 50 is equal to the distance between the grooves 60 and 80, the distance between the longitudinal axes of the waveguides in the groove 70 and the groove 50 is equal to the distance between the longitudinal axes of the waveguides inserted into the grooves 60 and 80. The cuts, which are at right angles to the flat surface of the carrier body 4', can be made along the lines I—I and the lines II—II as illustrated in FIG. 1, and in the present example these two lines I—I and II—II are identical to the diagonals of the square flat surface of the carrier body 4'.

The pair of cut surfaces formed by a cut are then polished to provide a pair of polished surfaces of the desired optical quality. It is noted that this polishing step is a conventional polishing step. A partially transmissive reflective layer is then applied to one of each pair of polished surfaces and will cover the polished cut surface of the fully separated light waveguide. Then the divided components or parts are reassembled and fixed so that the polished surfaces of each pair lie on opposite sides of a reflective layer and a longitudinal axis of the fully separated light waveguides are realigned as far as possible. It should be ensured that at each branching point, the branching light waveguide is not effected by the cutting and polishing steps.

As best illustrated in FIG. 2, the cutting along the diagonals will cut the waveguide in the groove 50 into three waveguides 51, 52 and 53. In a similar manner, a cutting of the waveguide in the branch groove 60 will form waveguides 61 and 62. It is also noted that the cutting did not effect either of the waveguides 7 or 8 which were in the grooves 70 and 80.

After the steps of polishing, reassembling of the parts and the securing and fixing of them together, the branch component 4 of FIG. 2 is formed. The component 4 is composed of four parts 41, 42, 43, and 44 and the partially transmissive reflective layer such as $F_1$, $F_2$ and $F_3$.

As illustrated, the partially transmissive layer $F_1$ separates the waveguide 51 from the waveguide 52 and the partially transmissive layer $F_3$ separates the second waveguide 52 from the third waveguide 53. It is noted that a fourth waveguide 61 branches from the first waveguide 51 and lies on the same side therewith from the layer $F_1$. It is also noted that the longitudinal axes $A_1$ and $B_1$ of these two waveguides 51 and 61 extend at right angles to each other and intersect on the surface of the reflective layer $F_1$ facing these two waveguides. A light waveguide 8 is adjacent the reflective layer $F_3$, extends to the left of the second waveguide 52 at right angles therewith. The longitudinal axes $C_1$ and $A_2$ of these waveguides 8 and 52 intersect on the surface of layer $F_3$ which faces towards these waveguides. The reflecting layer $F_2$ separates the fourth waveguide 61 from the fifth waveguide 62. It is noted that a seventh waveguide 7 has an axis $C_2$ that extends perpendicular to the axis $B_1$ and the waveguide 7 is on the same side as the waveguide 61 from the layer $F_2$. The axes $B_1$ and $C_2$ intersect on a surface of the layer $F_2$.

It is also noted that due to the fact that the waveguides 51, 52 and 53 were formed from the single waveguide during the cutting step, their axes $A_1$, $A_2$ and $A_3$ are substantially in alignment in a longitudinally extending direction. Also the axes $B_1$ and $B_2$ of the fourth waveguide 61 and the fifth waveguide 62 are also in alignment and extend at right angles to the axes $A_1$, $A_2$ and $A_3$. It is noted that the reflective layers $F_1$, $F_2$ and $F_3$ are inclined to each axis by 45° and that the plane formed by the layer $F_1$ is perpendicular to the common plane formed by the layers $F_2$ and $F_3$.

The production of the body having the grooves can be done by taking a large silicon disc. A flat surface of the disc is etched to form a first group of parallel equidistant grooves and at right angles to this first group of grooves, a second group of parallel equidistant grooves are etched. It is also possible to use a square plate such as illustrated in FIG. 1 in which case the grooves 60, 70 and 80 can be extended as illustrated in broken lines.

The partially transmissive reflective layers $F_1$, $F_2$ and $F_3$, which are applied to the polished surfaces of each pair of polished surfaces can consist of metallic reflective layers composed, for example, of aluminum and can have equal or differing transmissive capabilities. However, they can also consist of dielectric multiple layers of arbitrary design with regard to the spectral curve of the transmission/relection capacity. These multiple layers can be formed, for example, of SiO$_2$/TiO$_2$ alternating layers.

The provision of a part such as 41, 42, 43 and 44, with a reflective layer is already described in a copending U.S. patent application Ser. No. 093,519, filed Nov. 13, 1979 and based on German application No. P 28 51 679. In this application, the cementing of cut surfaces after shaping or polishing ensures that the fiber axis of the two portions joined together such as the portion 42-44 or 41-44 will have the fiber aligned as disclosed in the prior application. This is particularly true if an assembly device having positioned stop means is used. The double diagonal division for the two cutting planes of the present invention serves to compensate for cutting losses.

The described arrangement can be constructed as either a simple light branching element or component which is provided with one input at the first waveguide 51 and four outputs at the third waveguide 53, the fifth waveguide 62, the sixth waveguide 8, and the seventh waveguide 7 or the four inputs formed by the waveguides 8, 53, 7, 62 and one output formed by the first waveguide 51. In addition, a wavelength multiplexer or demultiplexer for four different light wavelengths can be formed by this component. If the component is used as a multiplexer or demultiplexer, the polished diagonal cut surfaces are expediently vaporized with the dielectric multilayer cut out filters, which transmit long waves or short waves. In the case of a demultiplexer, the filter formed in the reflective layer F$_1$ between the first and second waveguides 51 and 52 is provided to transmit a group of two of the four wavelengths into the waveguide 52 while reflecting the other two wavelengths into the fourth waveguide 61. The filter arranged between the second waveguide 52 and the third waveguide 53 is constructed to reflect one of the two wavelengths or a subgroup into the sixth waveguide 8 while passing the other wavelength as a subgroup into the third waveguide 53. In a similar manner, the filter in the layer F$_2$ is constructed to reflect one subgroup or wavelength of the two wavelengths in the fourth waveguide 61 into the seventh waveguide 7 while passing the other wavelength or subgroup into the fifth waveguide 62. When the device is used as a multiplexer, the radiation of the four different wavelengths which are fed in from the exterior at the waveguides 7, 8, 62 and 53 are fed in the reversed direction to the first fiber 51. In the case of a demultiplexer, in order to increase the crosstalk attenuation, it is advantageous to apply narrow band filters which transmit only the desired wavelength to the respective output fibers 7, 8, 53 and 62.

Although various minor modifications may be suggested by those versed in the art, it should be understood that we wish to embody within the scope of the patent granted hereon, all such modifications as reasonably and properly come within the scope of our contribution to the art.

We claim:

1. A branch component utilizing optical light waveguides selectively used for distributing light from an incoming waveguide between a plurality of outgoing waveguides and collecting light from a plurality of incoming waveguides into an outgoing waveguide, said component comprising a carrier body having at least seven light waveguides and three partially transmissive reflective layers disposed thereon, a first, second and third of the waveguides being arranged in a longitudinally extending first series and a fourth and fifth of said waveguides being arranged in a longitudinally extending second series, each of said adjacent waveguides in said series having their longitudinal axis being displaced less than the minimum displacement and inclined at less than the maximum permissable angle to insure light transfer therebetween, a first one of the reflective layers being disposed between the first and second waveguides of the first series, a second one of the reflective layers being disposed between the second and third waveguides, and a third one of the reflective layers being disposed between the fourth and fifth waveguides of the second series, each of said reflective layers being arranged to extend obliquely to the longitudinal axis of each of said waveguides, the second series of waveguides being arranged relative to the first series with the fourth waveguide engaging the first waveguide and being disposed on the same side of the first reflective layer, a sixth waveguide being arranged relative to the second waveguide to extend substantially parallel to the fourth waveguide and to be disposed on the same side as the second waveguide from the second reflective layer, a seventh waveguide extending substantially parallel to the first waveguide and being disposed relative to the fourth waveguide on the same side of the third reflective layer, the oblique angles of each of the reflective layers being arranged so that a beam traveling in the first waveguide is partially reflected into the fourth waveguide by the first layer which passes a remaining portion into the second waveguide, the remaining portion in the second waveguide being partially reflected into the sixth waveguide by the second layer which passes a portion into the third waveguide and the portion reflected by the first layer into the fourth waveguide will be partially reflected into the seventh waveguide by the third layer which will pass a portion into the fifth waveguide.

2. A branch component according to claim 1, wherein each of the reflective layers forms approximately a 45° angle with the axes of the adjacent waveguides.

3. A branch component according to claim 1, wherein the first reflective layer lies in a plane extending perpendicular to the plane formed by the second and third reflective layers.

4. A branch component according to claim 1, wherein the distance between the axes of the fourth and sixth waveguides is substantially equal to the distance between the axes of the first and seventh waveguides.

5. A branch component according to claim 1, wherein the component is used for demodulating an input light signal into four branches and each of the light transmissive reflective layers being reflective to certain wavelength ranges and passing other wavelength ranges so that the first layer splits the incoming light into a first and second group of wavelengths, the second layer subdivides the first group into two distinct subgroups and the third layer subdivides the second group into two distinct subgroups.

6. A process for producing a branch component which can be used for distributing light from an incoming waveguide into four outgoing waveguides or collecting light from four waveguides into a single outgoing waveguide, said component having seven waveguides and at least three partially transmissive reflective layers arranged on a carrier body with the first, second and third waveguides extending in series in a longitudinal direction, the fourth and fifth waveguides extending in a second series in a longitudinal direction at an angle of approximately 90° to the first series, the first reflective layer separating the first and fourth waveguides from the second waveguide, the second reflective layer separating the second and sixth wavegides from the third waveguide and the third reflective layer separating the fourth and seventh waveguides from the fifth waveguide, the process comprising the steps of providing a carrier body, forming a main groove in a flat surface of the carrier body, forming first and second branch grooves extending from opposite sides of the main groove at an angle thereto, forming a third branch groove from one of said first and second branch grooves at a distance from the main groove, placing a light waveguide in the main groove, placing light waveguides in the first and second branch grooves abutting against the waveguide in the main groove and placing a waveguide in the third branch groove abutting the waveguide in the groove in which the third branch intersects, splitting the body into a plurality of parts by a plurality of cuts extending at a right angle to the flat surface of the body with a cut being positioned at each intersection of grooves and the cut forming an acute angle with the two grooves in such a manner that only one of the two light waveguides in the groove is fully separated, polishing each of the cut surfaces to a desired finish to produce a pair of polished surfaces, applying a partially transmissive reflective layer to one of each pair of polished surfaces, said reflective layer covering a polished cut surface of one of the waveguides and then reassembling and fixing the parts together so that each pair of polished surfaces lay opposite each other and are separated by the respective reflective layer.

7. A process according to claim 6, wherein the first and second branch grooves extend parallel to one another with the spacing between their axes equal to the spacing between the main groove and the third branch groove which also extend parallel to each other, said first and second branch grooves being at right angles to the main groove and that each of the cuts is made at an angle of 45° to each of the intersecting grooves.

8. A method according to claim 6, wherein the step of forming each of the grooves comprises etching the grooves into the surface of the carrier body.

9. A method according to claim 6, wherein the step of forming each of the grooves comprises cutting the grooves into the surface of the carrier body.

10. A process according to claim 6, wherein the carrier body has a square configuration, said main groove and third branch groove extend parallel to a pair of edges of the substrate and are at the same distance from the adjacent edges, said first and second branch grooves extend parallel to the other pair of edges at the same distance from these edges and are perpendicular to the main groove, said cutting being done on two separate cutting planes which are diagonals of the carrier body and extend 45° to each of said intersecting grooves.

* * * * *